(12) United States Patent
Flitcroft

(10) Patent No.: US 8,769,043 B2
(45) Date of Patent: Jul. 1, 2014

(54) COMPUTER IMPLEMENTED SYSTEM AND METHOD FOR ENHANCING WEB BROWSING

(75) Inventor: Daniel Ian Flitcroft, Dublin (IE)

(73) Assignee: Daniel Ian Flitcroft, Dublin (IE)

( * ) Notice: Subject to any disclaimer, the term of this patent is extended or adjusted under 35 U.S.C. 154(b) by 245 days.

(21) Appl. No.: 13/284,351

(22) Filed: Oct. 28, 2011

(65) Prior Publication Data

US 2012/0110121 A1     May 3, 2012

Related U.S. Application Data

(60) Provisional application No. 61/407,660, filed on Oct. 28, 2010.

(51) Int. Cl.
*G06F 19/26* (2011.01)

(52) U.S. Cl.
USPC .......................................................... 709/217

(58) Field of Classification Search
USPC .......................................................... 709/217
See application file for complete search history.

(56) References Cited

U.S. PATENT DOCUMENTS

| | | | |
|---|---|---|---|
| 6,327,608 B1 * | 12/2001 | Dillingham | 709/203 |
| 7,685,224 B2 * | 3/2010 | Nye | 709/201 |
| 8,103,720 B2 * | 1/2012 | Deen et al. | 709/203 |
| 2002/0156917 A1 * | 10/2002 | Nye | 709/238 |
| 2003/0065571 A1 * | 4/2003 | Dutta | 705/26 |
| 2006/0253581 A1 * | 11/2006 | Dixon et al. | 709/225 |
| 2008/0114806 A1 * | 5/2008 | Kosche | 707/104.1 |
| 2009/0063451 A1 * | 3/2009 | Bennett | 707/5 |
| 2009/0077383 A1 * | 3/2009 | de Monseignat et al. | 713/175 |
| 2010/0186088 A1 * | 7/2010 | Banerjee et al. | 726/23 |
| 2010/0250666 A1 * | 9/2010 | Deen et al. | 709/203 |
| 2011/0218730 A1 * | 9/2011 | Rider et al. | 701/201 |
| 2013/0132568 A1 * | 5/2013 | Dankar et al. | 709/224 |

* cited by examiner

*Primary Examiner* — Tamara T Kyle
(74) *Attorney, Agent, or Firm* — Buchanan Ingersoll & Rooney PC

(57) ABSTRACT

The discloses method and apparatus ("system") enables users to: generate a map of computer servers visited while browsing, calculate the total distance travelled on the web, earn "Goosemiles" or travel points for the distance surfed on the web, earn bonus points for being the first member to access a specific site or web-page, leave an electronic flag or message for other users or specific users who visit the site later, set-up guided annotated tours of the web or "Goose hunts" for specific members or group of members where messages are left on a series of sites with each providing a clue to the next link in the chain until they reach the final site or prize. Also, phishing attacks are spotted by alerting them if a familiar site is located in a different location.

20 Claims, 3 Drawing Sheets

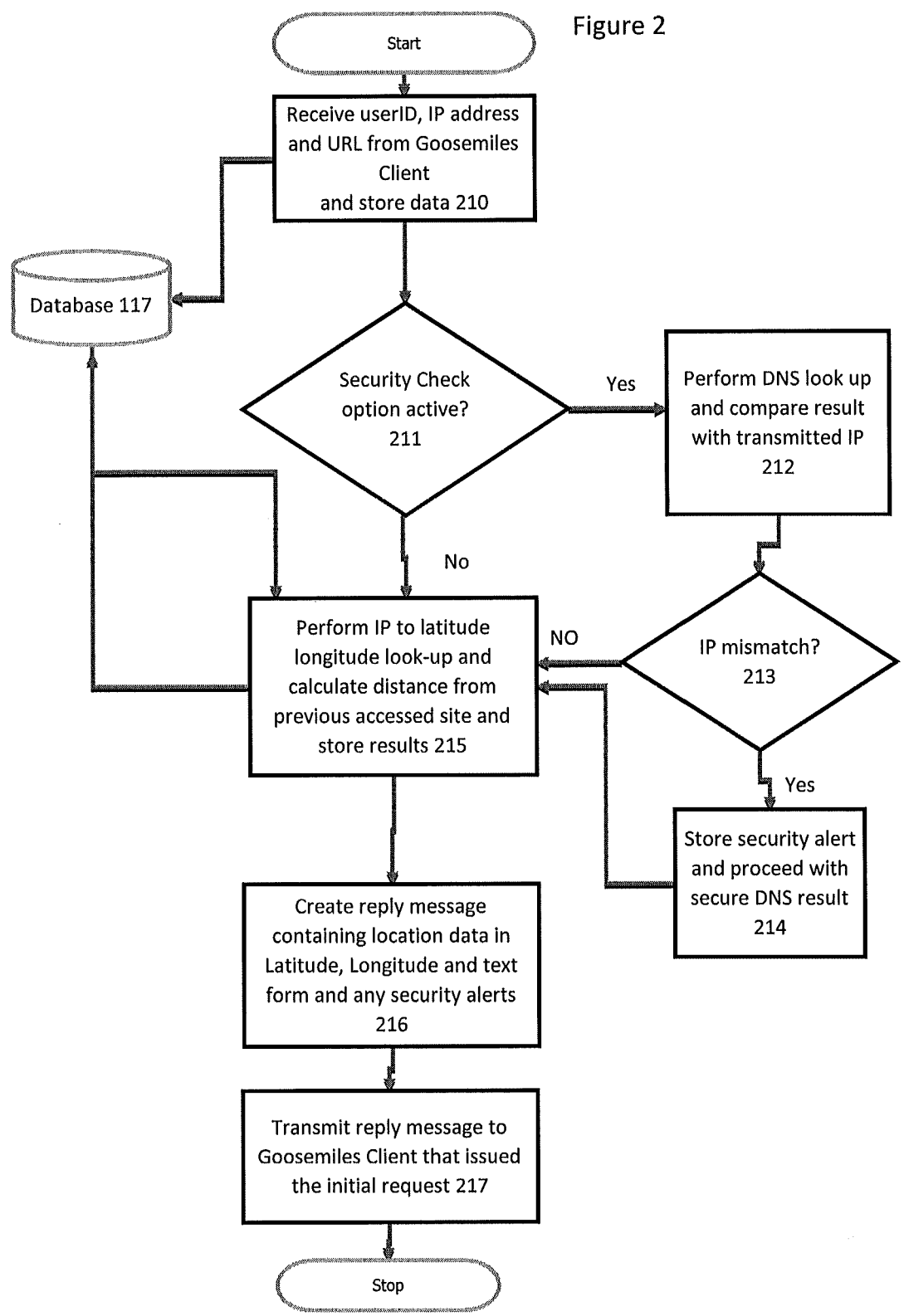

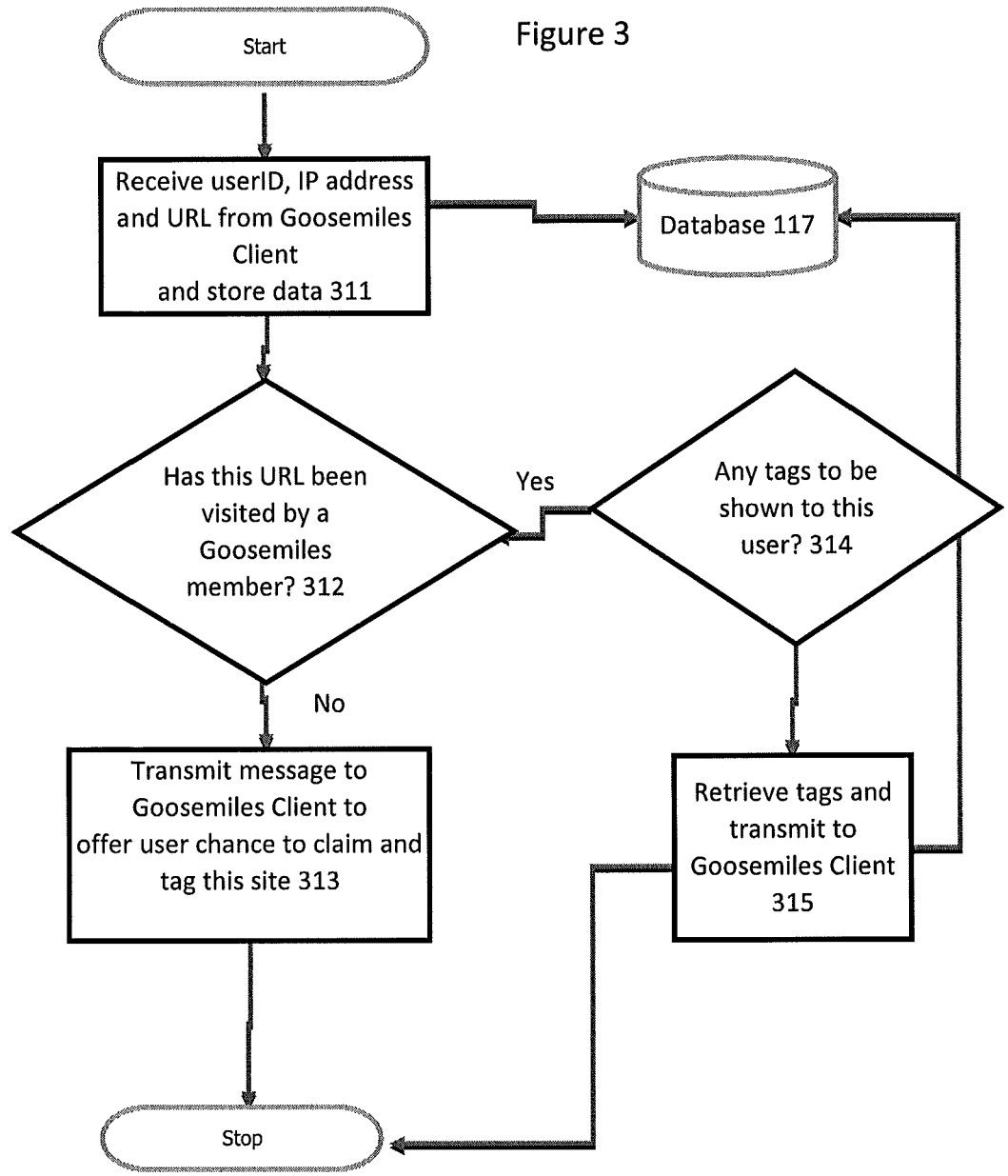

COMPUTER IMPLEMENTED SYSTEM AND METHOD FOR ENHANCING WEB BROWSING

TECHNICAL FIELD OF THE DISCLOSURE

The present document discloses methods of and apparatuses for enhancing web search and browsing, and more particularly for providing to the user information regarding the geographic location ("geolocation") of a server providing a web-page to the user to provide a user with a greater sense of exploring.

DESCRIPTION OF THE RELATED ART

The development of satellite imaging, global positioning system (GPS) and the Internet have led to the concept of geo-tagging where real places on the globe can be annotated with information by a range of web services such as Google earth. Services such as Flickr allow photographs and other images to be placed in a geographical context. The inverse of this has not been explored to anything like the same extent, namely placing individual websites in a geographical context. The internet is often referred to as a virtual world yet as users browse and search they are entirely unaware from where the data they are seeing is coming. Domain names once provided some notional sense of country but now with ".com" domains being supported by servers all over the planet and domains such as ".me", which should represent the small country of Montenegro, being used as a word not a location, this notional sense of country of origin has been lost.

Moreover, webmasters and those who build websites are familiar with the concept of tracking from what websites their visitors are coming but the visitors themselves are not usually given information concerning the physical location of a server.

Web users explore the world in similar fashion to the real world. When searching the web, users will typically follow three patterns: visit their regular sites, follow recommendations or links provided by others, or go searching for themselves. This behaviour parallels how people tend explore the real world as "stay-at-home" types, followers, or explorers. In other words, they spend a lot of time in a few familiar sites, or they will follow trends and recommendations of others to find the new hot-spot be that a site or a video on YouTube. Sometimes they will explore for themselves with the help of search engines to find new and interesting things.

Internet Functionality: The mapping of a domain name to a physical IP address is an essential function of the Internet and provided by the global DNS (Domain Name Servers) network. Mapping an IP address to a physical location is also a well known service often referred to as Geoip and provided by a range of companies including Maxmind Inc. These services are used almost exclusively by websites to track visitors; not to allow visitors to track their own travels around the physical world as they browse.

There are lots of recommendation services such as Digg.com, Del.icio.us, Stumbleupon which provide information about where to go in the manner of a guide book, but there are things you can only discover about a place in the real world by visiting it. The web tagging/annotation capabilities of the presently disclosed system encourage users to visit or discover sites for themselves and then leave their own comments for other visitors.

Foursquare.com offer a social network service based on geolocation. Users check-in with Foursquare usually using their GPS enabled cell phone. Depending on their physical location in a given town or city they can earn points or badges and meet fellow members. If they check-in at a given location more often than anyone else they can gain the honorary title of mayor of that location. It is important to note that Foursquare is a way of exploring the physical world with the aid of technology.

This is the same approach adopted by standard location technologies. They are applied to assist users in the real world. Recently the term "augmented reality" has been coined to cover this concept. This is the exact opposite of the approach adopted by the presently disclosed methods and apparatuses (generically referred to as "enhanced browser systems"—tentatively commercially referred to as "Goosemiles"), where the virtual world is mapped back to the physical location of its underlying hardware, something most users are entirely unaware. People can explore the physical world without the aid of technology just by walking or driving there, they cannot explore the online world in the same way without a service like the presently disclosed system.

SUMMARY OF THE ENHANCED BROWSING SYSTEM

Various embodiments of this enhanced browser system provide tools for users to explore the web as a physical place and track how many miles they travel around the world while browsing, claim discovery rights if they are the first user of the service to visit a particular site and leave the digital equivalent of a flag and a message, leave messages for other users, create web journeys for others to follow and/or web-hunts turning the internet into a tagged gaming zone, as examples.

This enhanced browser system provides users with tools to explore the web as if it were a real place and by providing specific tools enables them to do the following: generate a map of all the computer servers they have visited while browsing, calculate the total distance travelled on the web in miles or kilometers, earn "Goosemiles points" for the distance surfed on the web, earn bonus points for being the first member to access a specific site or web-page, earn the right for being the first member to access a specific site or web-page to leave an electronic flag or message for other users who visit the site later, leave a message for specific members or group of members on any site or web-page, set-up guided annotated tours of the web for specific members or group of members or a "Goose hunt" for specific members or group of members where messages are left on a series of sites with each providing a clue to the next link in the chain until they reach the final site or prize.

By providing real-time information on the country/city location of a website's servers the presently disclosed enhanced browser system also gives valuable information to help a user spot a phishing attack (i.e. a copy fraudulent of a website designed to capture personal data) by alerting them if a familiar site is located in a different location or country. Importantly these services do not require the modification of visited websites.

Exemplary embodiments of this enhanced browser system provide a geographical dimension to browsing and the same or other embodiments provide the ability to tag websites with specific information without the website owner's participation.

Exemplary embodiments of this enhanced browser system track each visited website during a web browsing session. At the start of each session central enhanced browser system server(s) calculate(s) the physical distance from the user's local IP (Internet Protocol) address to that of the first visited site and stores the physical location in latitude and longitude (lat/long) for that site in a database against the user's unique identifier. For each subsequent site visited this enhanced browser system calculates the distance between the last site and the new site as well as logging the lat/long data for that site. This allows the calculation of how many miles (or kilometers) a user has travelled during his web browsing and searching. The distance travelled during web browsing is recorded and either the physical distance or an equivalent amount of "Goosemiles" or distance points are added to a user's account. These points can be used to provide tables of the most travelled members of this enhanced browser system service as a form of social comparison. They can also be redeemed as products and services from commercial partners of the enhanced browser system.

This enhanced browser system service also provides the facility for the user to review on a map the physical location of the sites and associated servers. As this enhanced browser system tracks all web and search requests, it also checks whether this website has been visited before by any user. If the user is the first user of the service to reach this site then they get to claim it and annotate with an icon and a message, much as an explorer three hundred years ago might have left a flag. When subsequent users reach this site they will see who was the first person to visit and can view the message. They can also see how many users have visited since. Subsequent users can rate a site or leave a message for their friends or followers. This can just be a comment but this feature can also be used to create web-hunts, where a user can leave clues for a selected group on a particular site which if solved will lead them to another site with a message ultimately leading to a reward or prize at the final site in the hunt.

Alternatively or additionally, an annotated web tour can be created where a tour organizer creates a web itinerary for one or more users to follow. At each site visitors will find notes and instructions and a link to the next site.

BRIEF DESCRIPTION OF THE DRAWING FIGURES

The details of one or more aspects are set forth in the accompanying drawings and the description below. Other features, objects, and advantages will be apparent from the description and drawings, and from the claims.

FIG. 2 is a flow diagram illustrating an example of a method that may be performed by components in an electronic network to provide the presently disclosed enhanced browser system.

FIG. 3 is a flow diagram illustrating an example of a method that may be performed by components in an electronic network to provide the presently disclosed enhanced browser system.

DETAILED DESCRIPTION OF THE INVENTION

Figure 1:
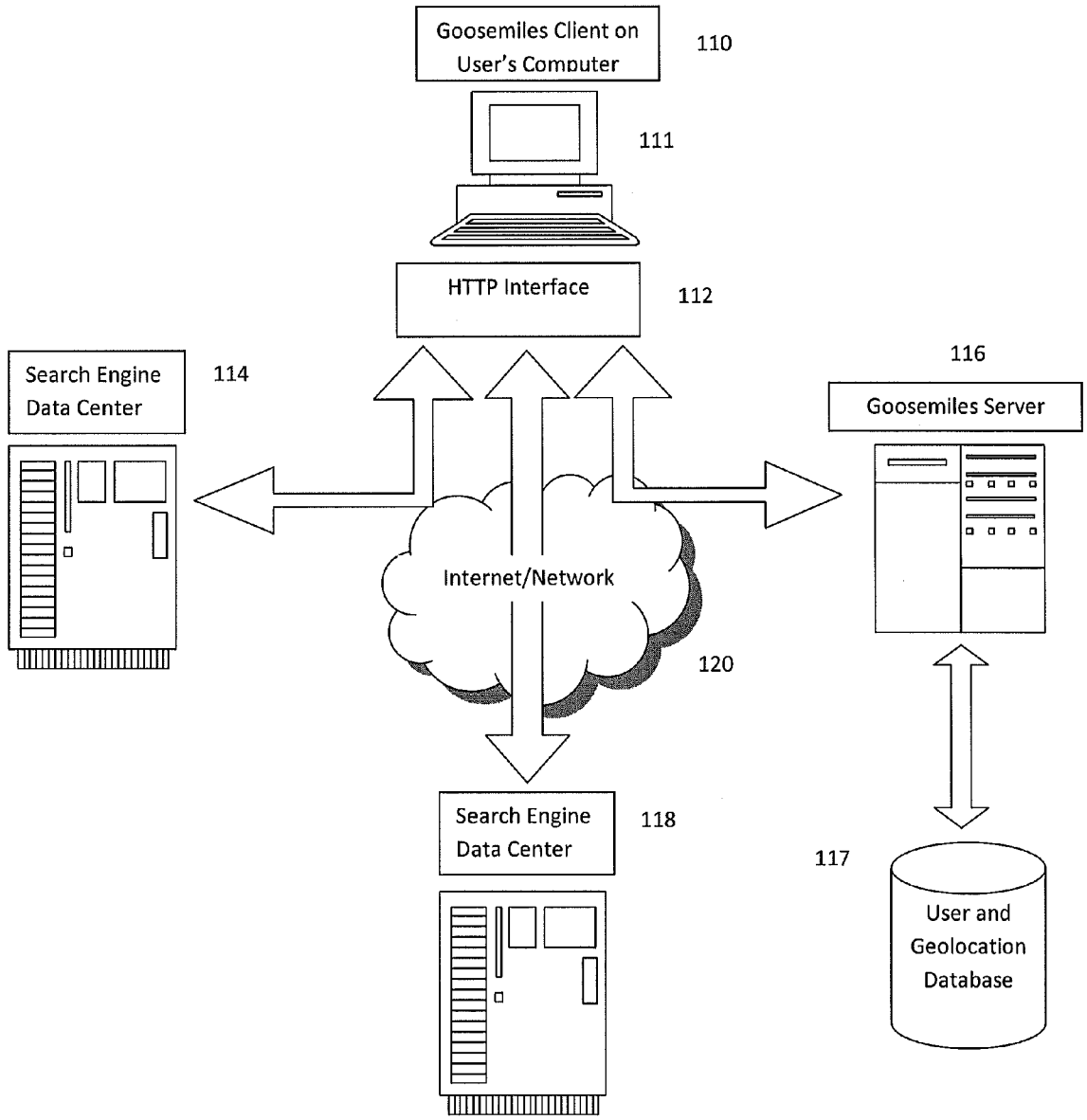
FIG. 1 is a block diagram of an exemplary electronic network that can be configured to facilitate the presently disclosed enhanced browser system.

An exemplary embodiment includes an application running on the user's Internet access device ("Goosemiles Client") 110 that can communicate with one or more dedicated Goosemiles remote server(s) ("Goosemiles Server") 116. The purpose of the Goosemiles Client 110, with its user device 111 (e.g., PC, tablet computer, smart phone or nearly any suitable browser enabled device having an interface 112) is to monitor Internet traffic. Internet traffic is monitored by examination of TCP/IP (transmission control protocol over Internet protocol) traffic on the ports used to web traffic (usually port 80 and port 443 for SSL communications). Here it should be noted that the Internet protocol is used as an exemplar, but other protocols could be used equally well, and that "webpage" is used to mean a single webpage or a website interchangeably.

In particular HTTP (HyperText Transfer Protocol) packet information and transmit the visited URL (Uniform Resource Locator or web address) and IP address data for each visited Internet site and associated web page to the Goosemiles Server 116. A range of approaches are possible to intercept HTTP packet data. These are covered by a variety of names such as packet analyzers, network analyzer, protocol analyzer or sniffer. An alternative is that the installation of the Goosemiles Client 110 also installs or configures a proxy server which captures the required data before forwarding all data onto Internet and transparently passes returning data back to the browser or Internet client. The HTTP data packets contain a wide range of data in each data request. Only the IP address and URL (Uniform Resource Locator or web address) of each site and page visited needs to be transmitted to the Goosemiles Server 116 to allow identification of the specific webpage being accessed, the content and any user submitted data does not need to be stored or transmitted. Indeed from a privacy perspective this may be advantageous to the user, limiting the transmitted information to the minimum required to complete the processing completed by the Goosemiles Server 116. This may also improve the efficiency of the service by limiting the amount of bandwidth required to transmit the data. The URL and IP data is transmitted to the Goosemiles Server 116 along with the user's unique identifier (userID). Here, the unique identifier may identify a team, or a team and an individual team member, or other affiliate type information.

The Goosemiles Client 110 also receives data back from the Goosemiles Server 116 relating to the physical location of a particular server and any messages or other information that the member should be shown on the basis of accessing a particular site and their user preferences. This data is then displayed on the display of a user's Internet access device 111 according to their preference profile, for instance.

The Goosemiles Client 111 can be a stand-alone program which is downloaded or otherwise installed on a users Internet access device 110 or may be part of an existing browser such as Windows Explorer, Chrome, Opera, Safari or Firefox. Alternatively the client 110 may be a program or mobile application with embedded browsing functionality to allow users to browse the web within a Goosemiles application.

The Goosemiles Server 116 performs the principal functions of logging user data, mapping an IP address to a physical location and handling the logic involved in tagging visited websites for storage in a user and geolocation database 117, and displaying the appropriate tags when a website is accessed.

Geolocative functions: On receipt of the IP address and URL and userID the Goosemiles Server 116 logs this data via the user and geolocation database 117. If only the URL is received, due to the nature of the Goosemiles Client 110 on a particular type of Internet access device 110, the Goosemiles Server 116 initiates a request to an appropriate secure domain name server (DNS lookup) (e.g., search engine data center 114) to determine the IP (Internet Protocol) of the computer hosting the URL. The IP address can then be mapped to a physical global location (latitude/longitude) using an appropriate geolocative database 117 hosted either remotely or within the Goosemiles Server 116. Note the user travel data and the geolocation data can be stored on the same server or separate servers, whether virtually separated or physically separated. This data is also logged and the physical distance from the last accessed website is calculated using standard geodetic algorithms such as the Haversine algorithm (or suitable alternative), which provides an accurate estimate of the shortest direct distance between two points:

$R$=earth's radius (mean radius=6,371 km)

$\Delta lat = lat_2 - lat_1$ $\Delta long = long_2 - long_1$ $a = \sin^2(\Delta lat/2) +$ $\cos(lat_1) \cdot \cos(lat_2) \cdot \sin^2(\Delta long/2)$ $c = 2 \cdot a \tan 2(\sqrt{a}, \sqrt{(1-a)})$ $d = R \cdot c$ The distance between the current and previous website is also logged and added to the user's profile within the database 117 and can also be converted into Goosemiles, a points based representation of distance which can also be used to redeem offers from Goosemiles commercial partners, for example. Various redemption mechanisms are known in the art, and the manner of redemption or the consideration associated therewith are not particularly limiting to the present enhanced browser system, and nearly any suitable mechanism can be used in conjunction herewith.

The latitude and longitude data can optionally be transmitted back to the Goosemiles Client 110 to facilitate the display of a websites physical location on a map or in text form describing the country, state, city etc on the user's own Internet access device. Users can select an option to make the Goosemiles Client 110 display a map or other geographic representation (e.g., a small map or satellite view of hybrids thereof, of the globe or particular country or icons relating to geolocation) displaying where they are currently accessing data in real time.

Web-tagging functions: On receipt of the URL and userID the Goosemiles Server 116 can also perform a database lookup in the database 117 to see if any Goosemiles user has accessed this particular server or webpage. The first Goosemiles member to access to a particular webpage or server earns the right to leave a "Flag" in the form of a small image of their choice and a message to subsequent Goosemiles members who visit and who have opted to see all public flags and messages. Such flags and messages should be appropriate and non-offensive. Flag image and message content can be reported by Goosemiles members to be inappropriate via the Goosemiles Client application 110 or main Goosemiles website 116. Also if a website owner complains or the Goosemiles website 116 itself deems a message inappropriate, the Goosemiles member can be requested to modify the message, or the Goosemiles Server 116 can censor inappropriate messages that are not modified in an appropriate manner.

If the webpage has been previously accessed by any Goosemiles member it will normally have been logged in the Goosemiles database 117 enabling a look-up to see if any messages, tags or images should be displayed to the Goosemiles user. A Goosemiles user will be shown the tag for any of the following exemplary reasons:

1) If they have opted to see all public tags.
2) If they have not previously selected the tick box that prevents the same tag being shown on subsequent visits.
3) If another Goosemiles member has left them a personal message.
4) If they are a member of a group for whom a message has been left.
5) If they are participating in a Goose-hunt which includes the current site.
6) If they are participating in a guided web-tour which includes the current site.

If any images, messages or tags that may be identified these can be transmitted back to the Goosemiles Client 110 for display on the user's Internet access device 111. On any site a Goosemiles member can use the Goosemiles Client 110 to save a message for another specific user or group of users.

A Goosemiles member can also use the Goosemiles Client 110 or the main Goosemiles website 116 to create either a Goose-hunt where a series of clues are linked to particular webpages and can be accessed by pre-defined users or any user who subsequently joins a Goose-hunt. For each site the person setting up the Goose-hunt leaves a clue in the form of a message which in isolation or in combination with the information on the particular tagged website guides the Goose-hunters onto the next page until they reach the end of the Goose-hunt. The end of a Goose-hunt may be marked by a member earning points or a prize. They may also be conducted for personal satisfaction or fun.

Similarly any Goosemiles member can create a webtour for specific Goosemiles members or a public tour which can be joined by any Goosemiles member. In this case each webpage on the tour has an associated message which is presented when the member loads that page into their browser. This message may contain additional information and tips about the specific site as well as links to the next site.

Social network integration: In certain embodiments, the Goosemiles Client 110 and Goosemiles website 116 allow any Goosemiles member to invite all their friends or followers on social network services such as Twitter and Facebook for example via these services own API's (application programming Interface) to a Goosehunt or Goosemiles web-tour. They can also leave a message for all their friends or followers on a specific single site.

User preferences: In certain embodiments, Goosemiles members can store preferences about which sorts of messages and tags they wish to view either via the Goosemiles client or the main Goosemiles website 116. Members may also log their areas of interest so that they may be invited to join particular special interest Goose-hunts or Goosemiles' web-tours.

Private browsing: In certain embodiments, Users can select an option to disable the Goosemiles Client to facilitate private browsing Security functions: The Goosemiles servers can also provide a degree of protection from several forms of fraudulent deception on the web, notably phishing and DNS hijacking where a computer or Internet access device's listed DNS servers are replaced with servers that supply false IP address data for certain sites. If the additional security options are selected any URL and IP address transmitted to the Goosemiles servers are checked against reference DNS servers to alert a user if they are being redirected to a false copy of legitimate site. In addition for any site the country of location can be displayed with a warning given for sites in countries with a poor history of Internet fraud.

Goosemiles website: In certain embodiments, the Goosemiles website 116 provides information about the Goosemiles service, the ability to sign-up for the Goosemiles, the ability to review detailed geographical and map data about your web-browsing activities, compare your cumulative distance travelled with other Goosemiles member, see the highest scoring Goosemiles members within a defined time period, set up Goose-hunts and Goosemile web-tours. The website operates as a standard website design and interacts with the Goosemiles Server to access required data and upload new data in the form of user details, user preferences, new Goosehunts or Goosemiles web-tours.

FIG. 1 illustrates an exemplary architecture implementation of an exemplary embodiment. The main algorithms and associated user and geolocative databases are hosted on a dedicated server (Goosemiles Server) 116 in the exemplary embodiment of FIG. 1. The Goosemiles Client application 110 monitors all web traffic via TCP/IP and HTTP. The address of each accessed web-page is transmitted to the Goosemiles Server 116. The Goosemiles Server 116 performs a DNS look up to locate the IP address of each website and uses the IP address and a geo-locative database to map the IP address to a physical latitude and longitude representing the location of the associated server hosting the website address. This can be done at the Goosemiles server 116, or through a search engine data center 114, for example. The Goosemiles Server 116 records the location of each accessed webpage against the user's unique user ID (or GroupID, or the userID can also identify a group or groups the member is part of). The location can also be transmitted back to the client to provide real-time data on the physical location of server providing a specific web page. The Goosemiles Server 116 also checks to see if this website has been previously accessed by a Goosemiles user. If not the Goosemiles Client 110 presents a message to the user allowing them to claim the site and leave a message to subsequent users. If the site is already listed on the Goosemiles Server database 117, a lookup is performed to see if any message or tag should be shown to the user on the basis of whether a message has been left for the user by another user or whether the user is participating in a particular Goosehunt or guided web tour. If so the appropriate message is displayed which can also contain a link to another webpage if required.

FIG. 2 illustrates an algorithm in the form of a flowchart for implementing Goosemiles server 116 to process geolocated functions. It begins with the receiving a userID, IP address and URL from Goosemiles Client 110 and storing the data in a database 117. Thereafter, it is determined whether its security check option is active (step 211). If it is, the process performs DNS look-up and compares result with the transmitted IP (step 212). If there is an IP mismatch (step 213), then the process stores and/or displays a security alert and proceeds with the secured DNS result (step 214). Thereafter, or if there is an IP mismatch, or if the security check option is not active, the system performs IP to latitude and longitudinal look-up and calculates that the distance from a previous access site to the current cite, and stores a result (step 215). This is done by accessing a database 117 to obtain longitude and latitude information for IP addresses, and algorithms for calculating such distances as mentioned above. Thereafter, reply message is created (step 216) containing location data and latitude, longitude and text form as well as any security alerts might be appropriate, in this particular embodiment. The reply message is then transmitted to the Goosemiles Client 110 that issued the initial request (step 217).

FIG. 3 is an algorithm in the form of a flowchart of the web tag retrieval and web site claiming function implemented on a Goosemile Server 116. It starts with receiving a userID, IP address and URL from a Goosemiles client and stores this data in the database 117 (step 311). Thereafter, it is determined whether this URL has been visited by a Goosemiles member (step 312). If it has not, the message is transmitted to the Goosemiles Client 110 to offer these or a chance to claim and tag this particular site (step 313). If it had been previously visited by a Goosemiles member, it may or may not have claimed and tagged the site depending on embodiment and usage, it is then determined whether any tags are to be shown to this user (step 314). If not, this sub-process stops. However, if yes, the process retrieves tags and transmits them to the Goosemiles Client 110 (step 315). The tags and messages can be used for Goosehunts and web tours, for instance, as explained above.

The techniques described in this disclosure may be implemented within one or more of a general purpose computer, microprocessor, digital signal processor (DSP), application specific integrated circuit (ASIC), field programmable gate array (FPGA), programmable logic device (PLD), or other equivalent logic devices. Accordingly, the term "computer" as used herein, may refer to any one or more of the foregoing structures or any other structure suitable for carrying out of the techniques described herein.

The various components illustrated herein may be realized by any suitable combination of hardware, software executed to configure hardware, or firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components executed in hardware. In some cases, various units may be implemented as programmable processes performed by one or more processors.

Any features described herein as modules, devices, or components may be implemented together in an integrated logic device or separately as discrete but interoperable logic devices, and may be used in any of a variety of image, display, audio, or other multi-multimedia applications and devices. In some aspects, for example, such components may form part of a mobile device, such as a wireless communication device handset (e.g., a mobile telephone handset).

If implemented in compiled software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

The above disclosure of exemplary embodiments provides an understanding of the present invention but the present invention is not limited to these exemplary embodiments. Variations and modification will occur to those skilled in the art without departing from the invention. These and other aspects are within the scope of the following claims.

What is claimed is:

1. An apparatus comprising:
    a server configured to (i) receive communications from a client application on a user computer and (ii) execute a server application, wherein said server application is configured to receive web traffic communications from the client application including data identifying address of accessed web-pages by a browser application on the user computer and a user identification code; and
    a geolocative database is configured to relate physical latitude and longitude to the locations of servers identified by an Internet Protocol (IP) address,
    wherein the server application is configured to (i) execute a Domain Name System (DNS) look-up to locate the IP address from data identifying address of accessed web-pages by a browser application on the user computer, (ii) access the geolocative database to map the IP address to a physical latitude and longitude representing a location of a server associated with hosting a web-page identified in a web-traffic communication received by the server from a client application of a user computer, and (iii) record the location of each server associated with hosting a web-page identified in a web-traffic communication received by the server from a client application of a user computer against the user's user identification code.

2. The apparatus of claim 1, wherein said server is further configured to transmit back to the client application the location of each server associated with hosting a web-page identified in a web-traffic communication received by the server from a client application of a user computer.

3. The apparatus of claim 1, wherein said server is further configured to transmit back to the client application in substantially real-time the location of each server associated with hosting a web-page identified in a web-traffic communication received by the server from a client application of a user computer, to provide real-time data on the physical location of the server providing a specific web page.

4. The apparatus of claim 3, wherein said real-time data on the physical location of the server providing the specific web page may cause a message to be generated to alert the user of a possible phishing attack.

5. The apparatus of claim 1, wherein said server is further configured to check whether a web-page identified in a web-traffic communication received by the server from a client application of a user computer had been previously accessed by a user who is a member of the same service and, if not, present a message to the user to allow the user to claim the site and leave a message for subsequent users who are members of the same service.

6. The apparatus of claim 1, wherein said server is further configured to check whether a web-page identified in a web-traffic communication received by the server from a client application of a user computer had been previously accessed by a member of the same service and, if the web-page had been previously visited by a member of the same service, determining whether any message or tag is designated to be shown to the user from a user previously accessing the web-page.

7. The apparatus of claim 6, wherein said message or tag may identify one or more of (i) a guided web tour and (ii) a Goosehunt, wherein said message provides a clue for reaching a final web-page.

8. The apparatus of claim 1, wherein said server is further configured to generate a map of all the computer servers visited during a predefined period.

9. The apparatus of claim 1, wherein said server is further configured to calculate the total distance travelled on the web.

10. The apparatus of claim 1, wherein said server is further configured to award points to a user for being the first member to access a specific site or web-page, or achieve a predetermined total distance.

11. An method for enhancing a browsing experience, comprising the steps of:
    receiving at a server web traffic communications from a client application on a user computer, wherein said communications include data identifying address of accessed web-pages by a browser application on the user computer and a user identification code;
    executing a Domain Name System (DNS) look-up to locate the IP address from data identifying address of accessed web-pages by a browser application on the user computer;
    accessing a geolocative database to map the IP address to a physical latitude and longitude representing a location of a server associated with hosting a web-page identified in a web-traffic communication received by the server from a client application of a user computer; and
    recording the location of each server associated with hosting a web-page identified in a web-traffic communication received by the server from a client application of a user computer against the user's user identification code.

12. The method of claim 11, further comprising transmitting back to the client application the location of each server associated with hosting a web-page identified in a web-traffic communication received by the server from a client application of a user computer.

13. The method of claim 11, further comprising transmitting back to the client application in substantially real-time the location of each server associated with hosting a web-page identified in a web-traffic communication received by the server from a client application of a user computer, to provide real-time data on the physical location of the server providing a specific web page.

14. The method of claim 13, further comprising generating a message to alert the user of a possible phishing attack when said real-time data on the physical location of the server providing the specific web page is not normal.

15. The method of claim 11, further comprising checking whether a web-page identified in a web-traffic communication received by the server from a client application of a user computer had been previously accessed by user who is a member of the same service and, if not, presenting a message to the user to allow the user to claim the site and leave a message for subsequent users who are members of the same service.

16. The method of claim 11, further comprising checking whether a web-page identified in a web-traffic communication received by the server from a client application of a user computer had been previously accessed by a user who is member of the same service and, if the web-page had been previously visited by a member of the same service, determining whether any message or tag is designated to be shown to the user from a user previously accessing the web-page.

17. The method of claim 16, wherein said message or tag may identify one or more of (i) a guided web tour and (ii) a Goosehunt, wherein said message provides a clue for reaching a final web-page.

18. The method of claim 11, further comprising generating a map of all the computer servers visited during a predefined period.

19. The method of claim 11, further comprising calculating the total distance travelled on the web.

20. The method of claim 11, further comprising awarding points to a user for being the first member to access a specific site or web-page, or achieve a predetermined total distance.

* * * * *